United States Patent
Arnold

[15] 3,672,041
[45] June 27, 1972

[54] METHOD AND APPARATUS FOR INSERTING COIL TURNS INTO THE SLOTS OF A MAGNETIC CORE

[72] Inventor: Richard B. Arnold, Fort Wayne, Ind.
[73] Assignee: General Electric Company
[22] Filed: Dec. 21, 1970
[21] Appl. No.: 100,219

[52] U.S. Cl. .............................29/596, 29/205 R, 29/606, 140/71
[51] Int. Cl. ..............................................H02k 15/00
[58] Field of Search .................29/596, 598, 606, 205 R; 140/71, 92.1, 92.2

[56] References Cited

UNITED STATES PATENTS

| | | | |
|---|---|---|---|
| 3,528,170 | 9/1970 | Duff et al. | 29/596 |
| 2,934,099 | 4/1960 | Mason | 140/92.1 |
| 2,432,267 | 12/1947 | Adamson | 29/205 X |
| 2,836,204 | 5/1958 | Mason | 140/92.1 |
| 3,151,638 | 10/1964 | Hill | 140/92.1 |
| 3,324,536 | 6/1967 | Hill | 29/205 |
| 3,447,225 | 6/1969 | Eminger | 29/205 |

Primary Examiner—John F. Campbell
Assistant Examiner—Carl E. Hall
Attorney—John M. Stoudt, Radford M. Reams and Ralph E. Krisher, Jr.

[57] ABSTRACT

Method and apparatus for inserting side turn portions of electrical coils in a coil group into selected axially extending coil receiving slots of a magnetic core and for freely shedding end turn portions of at least some of the turns within at least two coils of a coil group radially toward a generally solid or yoke section of the core as the side turn portions of other turns in the selected coils are moved axially toward an end face of the core. Preferably, the at least two coils include two of the innermost coils in a coil group. The side turn portions of the electrical coils are inserted into the axially extending slots by coil turn feeder blades movably supported relative to the divider blade section. The divider blade section and the turn pushing surfaces of the coil turn feeder blades define the side and bottom, respectively, of a series of turn-receiving gaps which have openings in the free extremity of the divider blade section and in which the electrical coils are carried. Insulator pushers may also be provided for inserting insulators into slots after side turn portions of coils have been placed therein.

An actuating assembly includes a driver actuated by a suitable power source and effects continuous axial movement of insulator pushers through first, second and third increments of travel to effect placement of insulators in the slots. The divider blade section and the coil turn feeder blades are conjointly actuated in an axial direction during the second increment of travel. Upon completion of the second increment of travel the divider blade section extends axially through the bore of the magnetic core. At this time, the free extremity of the divider blade section in the vicinity of at least two turn-receiving gaps in which the two innermost coils are carried is spaced closely adjacent to the end face of the core. Preferably, the end face of the core and the divider section surface are within one eighth to one quarter inch of each other. During the third increment of travel, the insulator pushers and the coil turn feeder blades are moved in an axial direction relative to the core and divider blade section. During this increment of travel, as the end turn portions of the two innermost coils in one or more selected coil groups move to the gap openings in the free extremity of the divider blade section, the end turn portions move away from the gap openings and toward the yoke section of the core. The method and apparatus can be used even when insulators are not being inserted.

9 Claims, 20 Drawing Figures

3,672,041

PATENTED JUN 27 1972

INVENTOR:
Richard B. Arnold,
BY Ralph E. Krisher Jr.
Attorney.

INVENTOR.
Richard B. Arnold,
BY Ralph E. Krisher Jr.
Attorney.

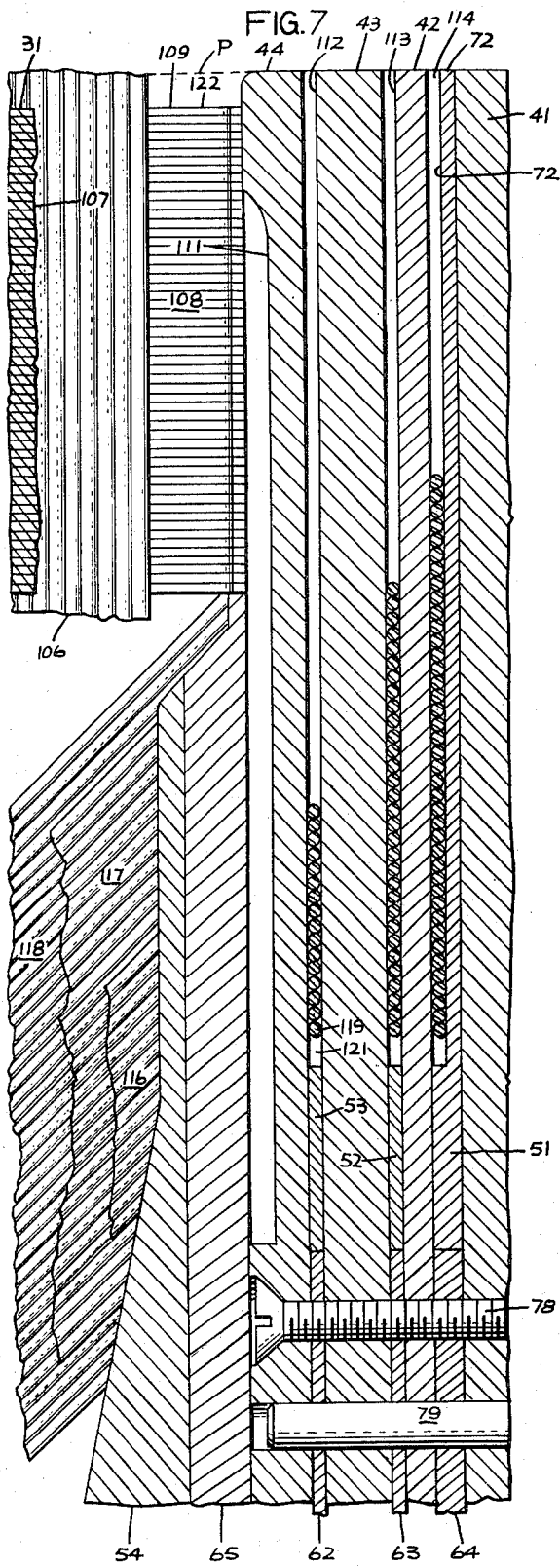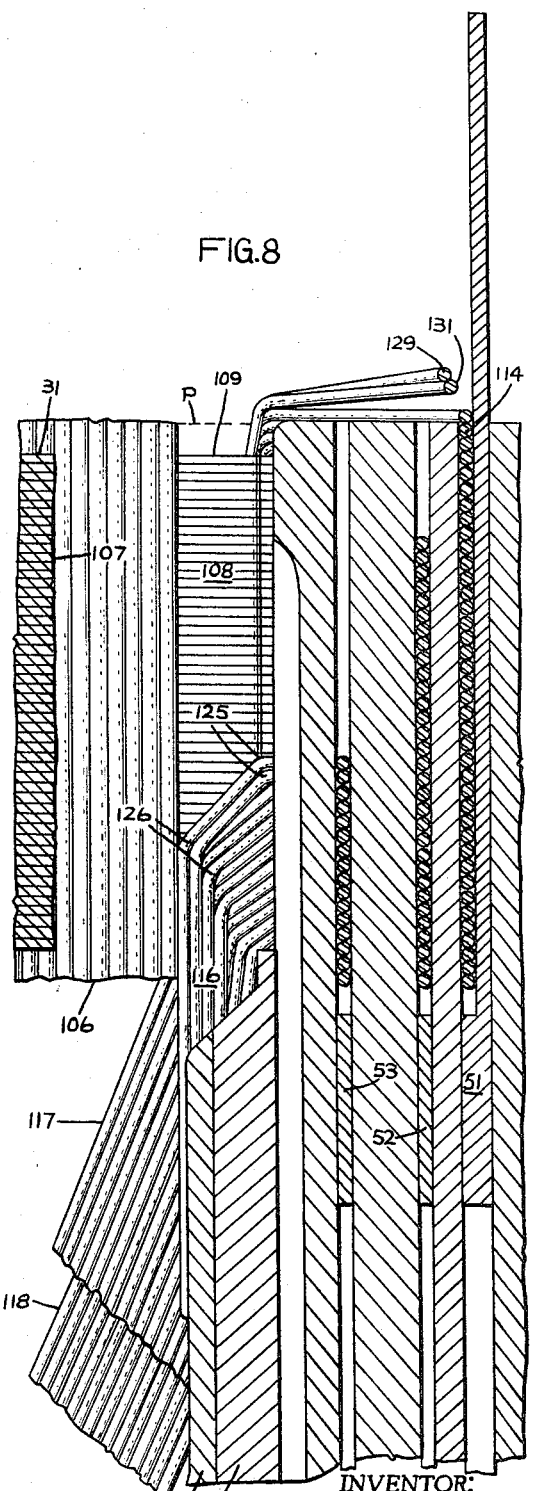

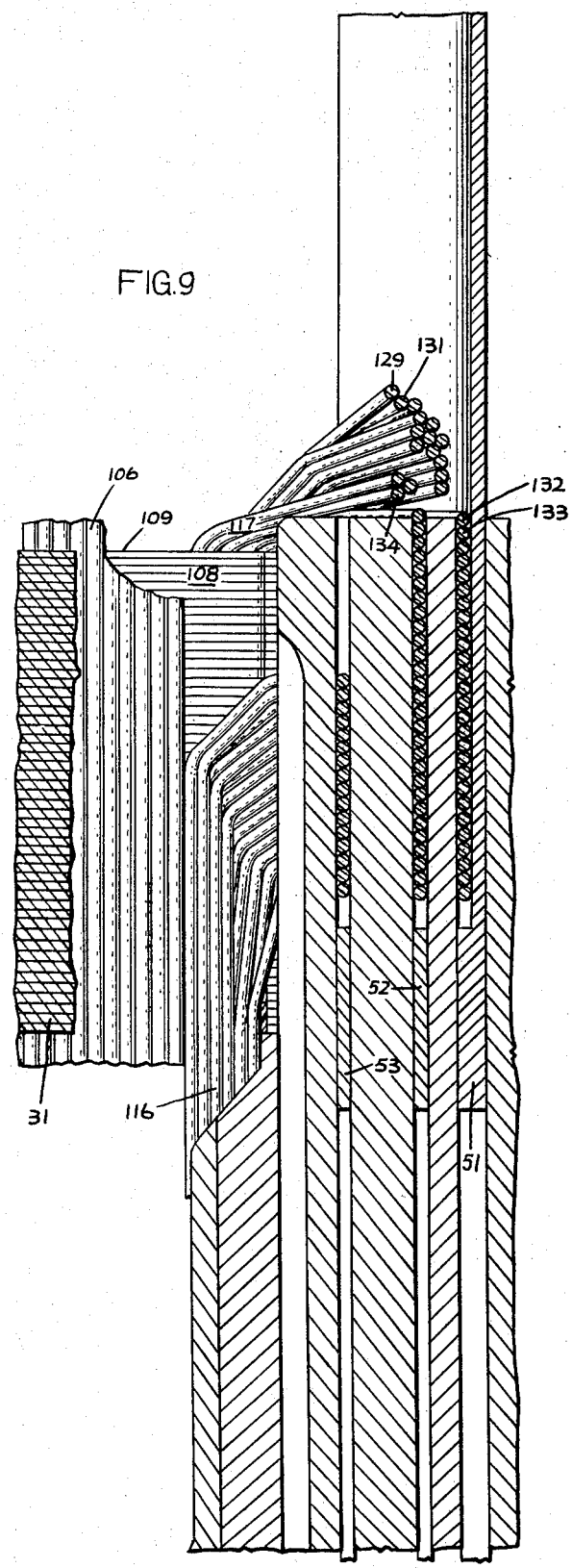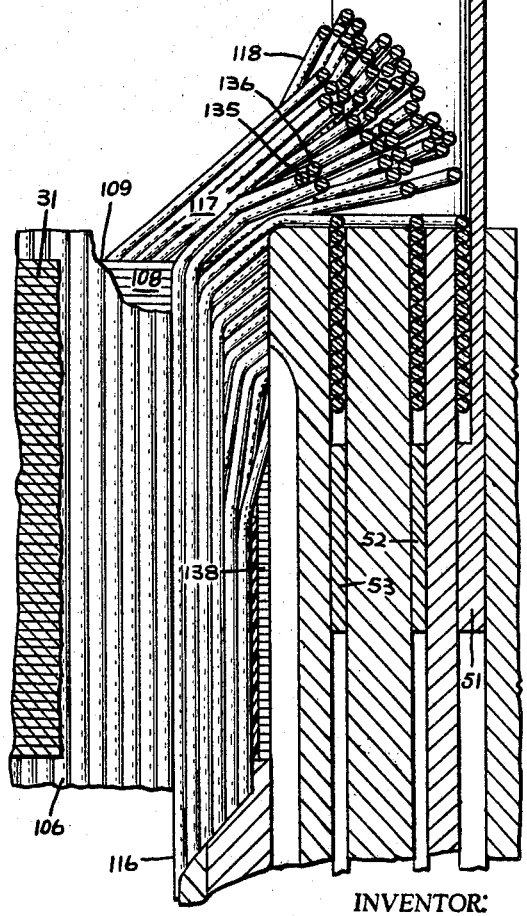

INVENTOR:
Richard B. Arnold,
By Ralph E. Krisher Jr.
Attorney.

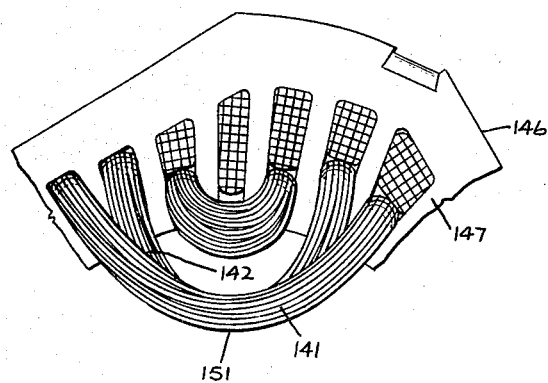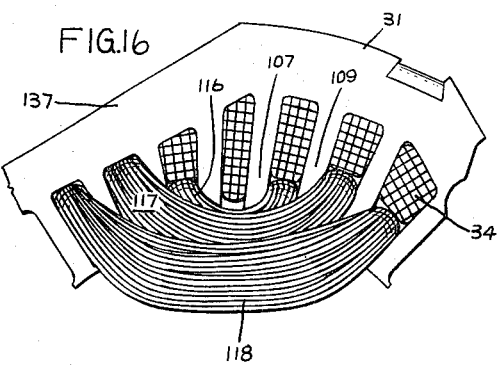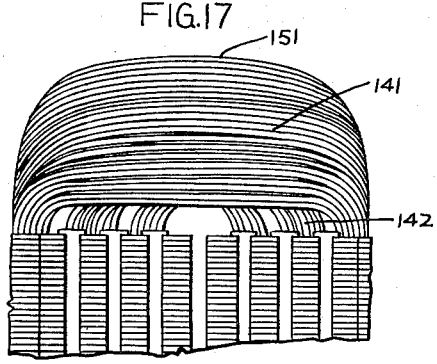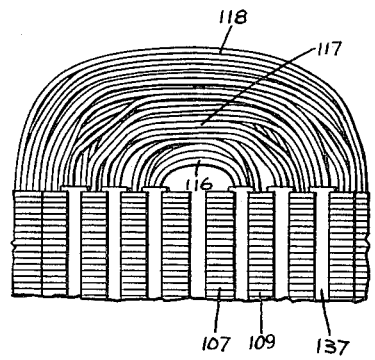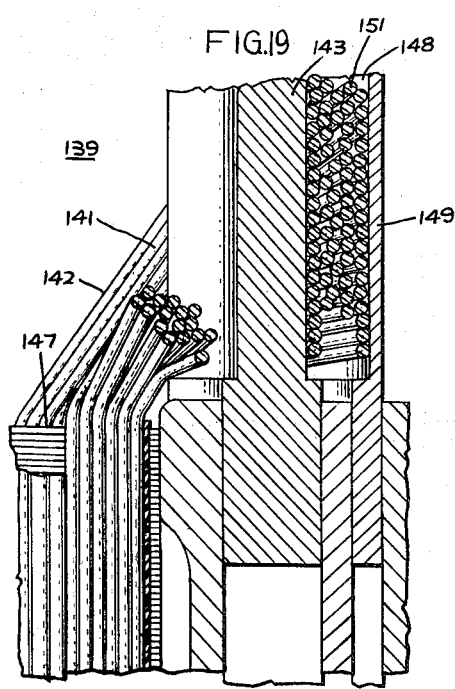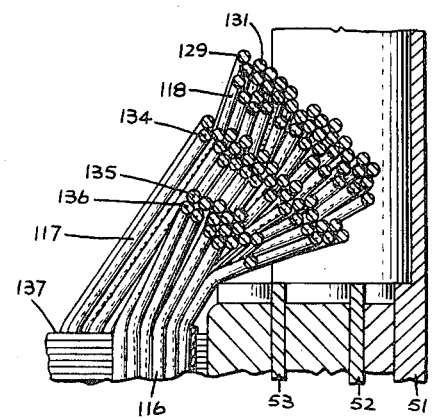

3,672,041

METHOD AND APPARATUS FOR INSERTING COIL TURNS INTO THE SLOTS OF A MAGNETIC CORE

CROSS REFERENCE TO RELATED APPLICATIONS

This application contains subject matter related to my copending application Ser. No. 875,895 filed Nov. 12, 1969, which in turn is a continuation-in-part of my copending application Ser. No. 748,405 filed July 29, 1968 and now abandoned.

BACKGROUND OF THE INVENTION

The present invention relates to an improved method and apparatus for inserting or injecting side turn portions of an electrical coil in the slots of a magnetic core and for moving end turns of an electrical coil toward a generally solid section of the core. More particularly, the invention relates to a method and apparatus for inserting in the slots of a core the coil side turn portions of at least the two innermost coils in at least one coil group of a stator winding, and moving the end turn portions of the coils toward a generally solid section of the core to permit the economic utilization of winding material in the end turn portions of the coils.

My copending application Ser. No. 875,895 is a related application and refers to the A. P. Adamson U.S. Pat. No. 2,432,267 and sets forth many of the desirable advantages that may be attained when coil-inserting or injecting apparatus includes parts of a relatively rigid construction.

Many of the disadvantages associated with prior arrangements, as identified and discussed in my related application for example, are manifest in damaged winding turns and/or damaged coil-inserting tools. Another disadvantage associated with the use of earlier arrangements is that the end turn portions of the coils in coil groups are trapped and retained in a stator core bore locale or a region adjacent the bore or an extension of the bore during insertion of the coil side turns in axially extending slots of the core.

Because of this retention of end turns in a bore region or locale, the end turn portions of the coils have been longer than might otherwise be necessary and the means conductor length of coil turns has been longer than necessary, particularly when two or more of the innermost coils in a coil group have the side turns thereof arranged in relatively closely spaced pairs of slots. This type of arrangement most frequently occurs in six-pole and four-pole winding applications.

It will be understood that by providing shorter end turns, a shorter mean coil turn length per coil can be provided, economies in conductor material usage may be realized, and, for a given design, improved operating efficiencies may be achieved since reduced end turn conductor length will also result in reduced total electrical resistance in a coil.

With earlier coil-inserting apparatus, while the side turn portions of coils have been positioned within axially extending slots of a core, the coil-inserting tools have trapped the coil end turns in the locale of the bore. Thereafter the coil-inserting tools have been withdrawn from the bore of the core, and the coil end turns have been at that time released in the bore region of the core. This has required the provision of coil end turns of sufficient length to permit extension thereof into the region of confinement. It would be desirable to provide an improved method and apparatus for inserting side turn portions of coils into axially extending slots of a core while promoting the economic utilization of conductor material in the end turns of at least two of the innermost coils of a coil group.

SUMMARY OF THE INVENTION

Accordingly, it is a general object of the present invention to provide an improved method and apparatus for inserting side turn portions of a coil into a core having axially extending slots that promote the economic utilization of winding material.

It is another general object of the present invention to provide an improved method and apparatus for inserting side turn portions of coils into preselected slots of a slotted structure such as, for instance, a stator of a dynamoelectric machine, wherein at least some of the conductor end turns of at least two of the innermost coils of at least one selected coil group are moved radially away from a first position in the bore region of a slotted core toward a generally solid section of the core.

Another more specific object of the present invention is to provide an improved method and apparatus wherein the end turn portions of at least the two innermost coils in at least one selected coil group are moved along gaps defined by stationary coil group separators to gap openings in the free extremities of the stationary apparatus and causing the end turn portions to be moved away from the gap opening toward a generally solid section of a core while side turn portions of the coils are being moved axially through an axially extending core slot.

In carrying out the objects of my invention in one form, I have provided an improved method and apparatus for axially moving the side turn portions of at least the two innermost coils of a selected coil group along selected slots of a slotted structure, as for example, the slots of the stator core of a dynamoelectric machine, while effecting movement of at least some of the end turn portions of the same two innermost coils from an initial position adjacent a coil turn-receiving gap toward a generally solid section of the core. The apparatus also includes, in a preferred form, means for holding and guiding insulators that may be placed under the slots of a slotted core structure as more particularly described in my application Ser. No. 875,895.

The apparatus, in a preferred form, includes coil insertion means comprising coil turn confining means in the form of divider blades which may define the side of coil turn-receiving gaps and coil turn feeder blades having turn-feeding surfaces movable relative to the divider blades. The feeder blade turn-feeding surfaces, for at least the two innermost coils in a selected coil group, form free extremities of the feeder blades. In the extended position of these feeder blades, the turn-feeding surfaces are approximately coextensive with the free extremity of the divider blade section in which turn-receiving gaps are formed. The insulator pushers, divider blade section, and coil turn feeder blades are actuated by means in form of an actuating assembly as described in my application Ser. No. 875,895.

During a first increment of travel, the insulator pushers (when used) are brought into driving engagement with insulators in an insulator guide means. Then, during a second increment of travel, the divider blade section and coil turn feeder blades are conjointly moved a predetermined distance through the bore of the slotted core. At this time the divider blade section dwells with the free extremity thereof having formed therein the gap openings for receiving at least two selected innermost coils of a coil group, lying in closely spaced relationship with an end face of the slotted core. Then, during a third increment of travel, the coil turn feeder blades move relative to the divider blade section and feed the end turns of the coils in the coil groups toward the gap openings. As the end turn portions of at least the selected innermost coils are pushed to the gap openings, they are caused to move away from the gap openings toward the yoke of the core. During the third increment of travel, only the coil turn feeder blades and the insulator pushers are driven.

The improved method includes the steps of positioning turns of wire in gaps formed in a substantially solid turn-receiving member, moving the turn-receiving member axially adjacent to a slotted structure until at least a portion of the free extremity thereof lies approximately adjacent to an end face of the slotted structure, thereafter moving the side turns of at least two selected coils axially along the slots while moving the ends turns of the selected coils axially along the gaps to the gap openings in the free extremity of the divider blade section, and causing the end turns of the selected coils to be moved toward a generally solid section of the core as they emerge from the gap openings. After the end turn portions of all of the coils have emerged from the gap openings, the feeder blades and divider blade section are retracted to an initial position and the core and coil groups are removed from the coil turn inserting apparatus.

The subject matter which I regard as my invention is particularly pointed out and distinctly claimed in the concluding portion of the specification. The invention itself, however, taken with further objects and advantages thereof, may be best understood by reference to the following description taken in conjunction with the accompanying drawings in which like reference numerals have been used to identify like parts and in which:

BRIEF DESCRIPTION OF THE DRAWINGS

FIG. 7 is an enlarged fragmentary sectional view, with parts removed and parts broken away of the FIG. 1 apparatus, and a fragmentary sectional view of a stator core with the coil turns shown in their respective positions after insulator pushers have been driven through an increment of travel;

FIG. 8 is an enlarged fragmentary sectional view similar to FIG. 7 emphasizing movement of coil end turns during a third increment of travel;

FIG. 9 is a view similar to FIG. 8 emphasizing the continued movement of coil turns during the third increment of travel;

FIG. 10 is a view similar to FIG. 9 emphasizing movement of coil turns during a later portion of the third increment of travel;

FIGS. 15–20 illustrate, with side by side comparisons, advantages that may be attained by practicing the invention; and, more specifically, FIG. 15 is a plan view of a core section, with parts broken away, representing the location of a selected coil group when the present invention is not utilized;

FIG. 16 is a plan view substantially identical to FIG. 14;

FIG. 17 is an elevational view, with parts broken away, of the structure shown in FIG. 15;

FIG. 18 is an elevational view substantially identical to FIG. 12;

FIG. 19 is a representation of a portion of an apparatus that may be used to provide the structure of FIG. 15; and FIG. 20 is a reproduction of a portion of FIG. 11.

DESCRIPTION OF THE PREFERRED EMBODIMENTS

Having more specific reference now to the drawings and particularly to FIGS. 1 through 6, I have illustrated therein an insulator and turn inserting apparatus adapted for use in placing a six-pole winding on a stator core 31 adapted for two speed operation and having a start winding, a four-pole main winding, and a six-pole main winding. The start winding 32 and main windings 33, 34 have been shown in schematic form in FIG. 4 for purposes of clarity.

Figure 4:
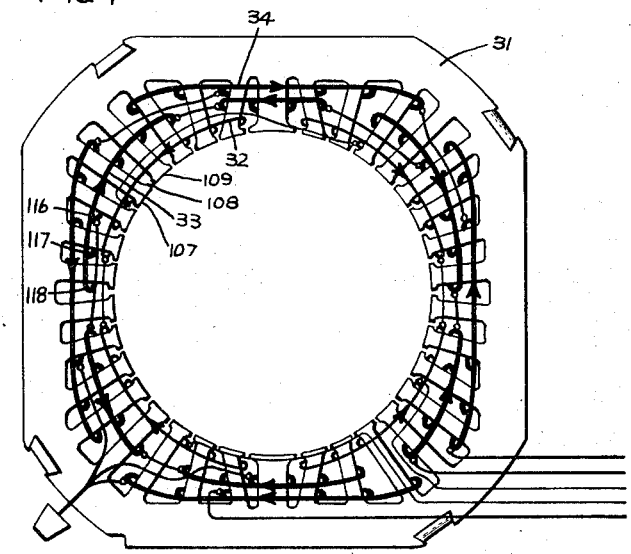
FIG. 4 is a plan view of a stator core, showing the arrangement of windings thereon in schematic form, with which the invention may be practiced with particular advantage.
Figure 5:
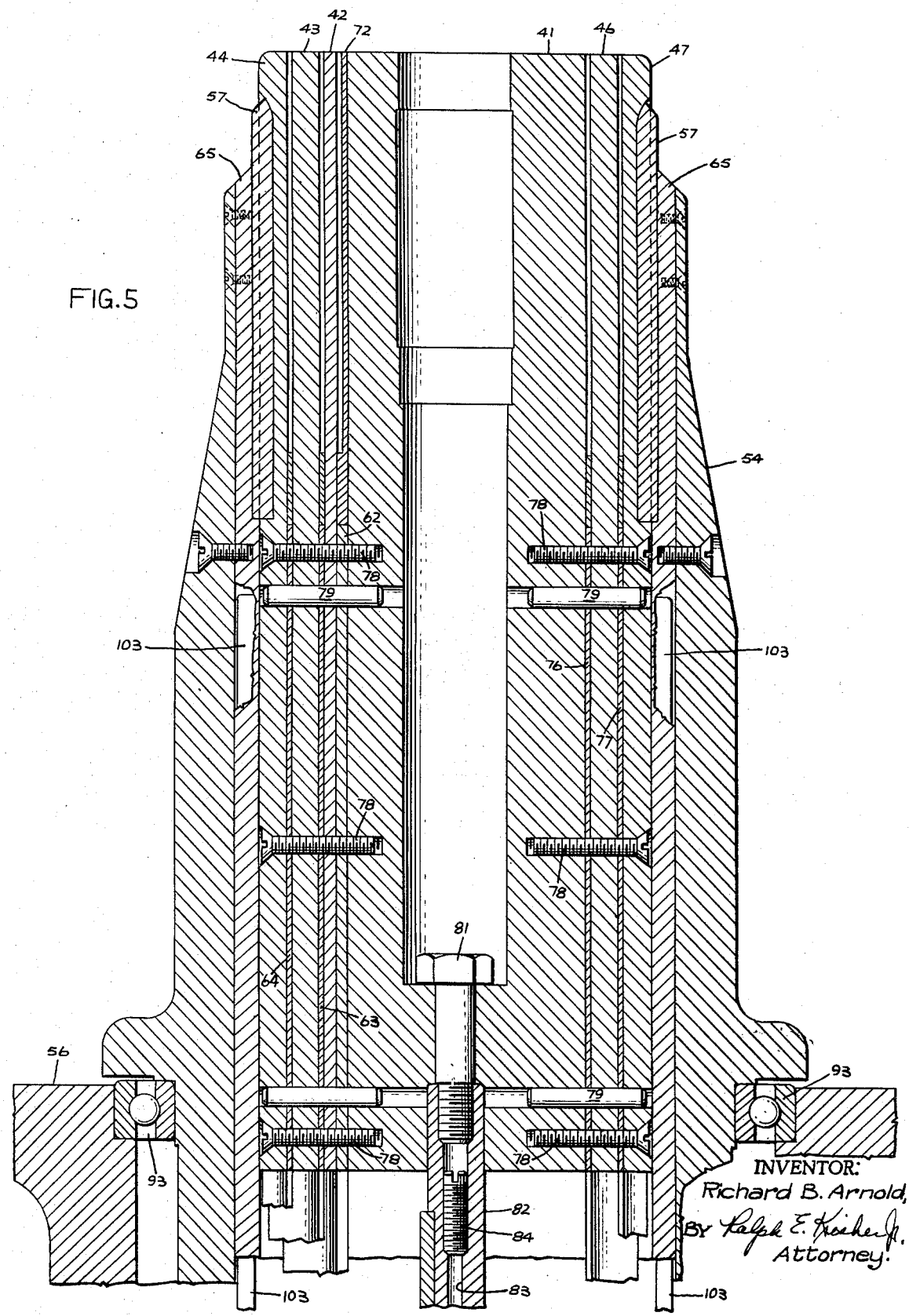
FIG. 5 is the upper portion of a sectional view taken in the direction of the arrows 5—5 in FIG. 3.
Figure 6:
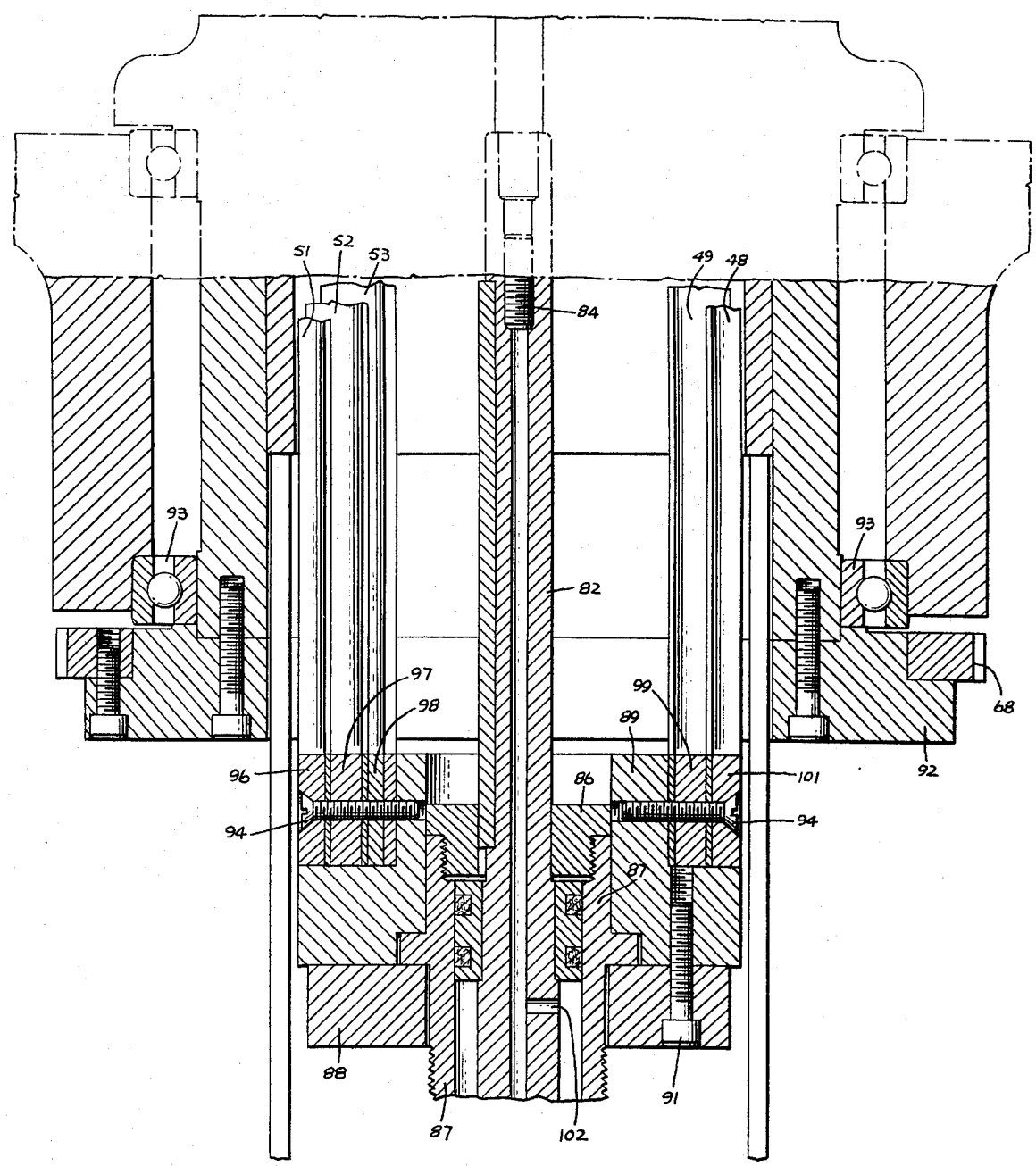
FIG. 6 is the bottom portion of the view shown in FIG. 5.

In the interest of completeness of description the structure of FIG. 4 will be more completely described. The four-pole winding 34 was formed of 0.0508 inch diameter aluminum wire and included a turn distribution of 17, 27 and 30 turns from innermost to outermost coils, respectively, for each of the four poles. The six-pole winding 33 was formed of 0.0427 inch diameter copper wire and included six coil groups with an innermost coil to outermost turn distribution of (16, 16, 13); (16, 16); (16, 31, 40); (14, 31); (16, 31, 40); (16, 16). These windings were then innerconnected for two speed operation as taught in Stout U.S. Pat. No. 3,153,184 which issued Oct. 13, 1964. The start winding 32 is formed of relatively fine enameled copper wire, e.g., 0.0213 inch diameter wire with a turn distribution, in each of four poles, one coil group per pole, with 10, 25, and 40 turns for the innermost to outermost coils, respectively, in each coil group.

The present invention may be more advantageously utilized while placing six-pole and four-pole windings on a stator core with coil-inserting apparatus including a substantially solid turn-receiving member. Accordingly, the invention will be described in connection with a preferred form of apparatus particularly adapted for placing the six-pole winding 33 on the stator core 31.

Figures 1, 2:
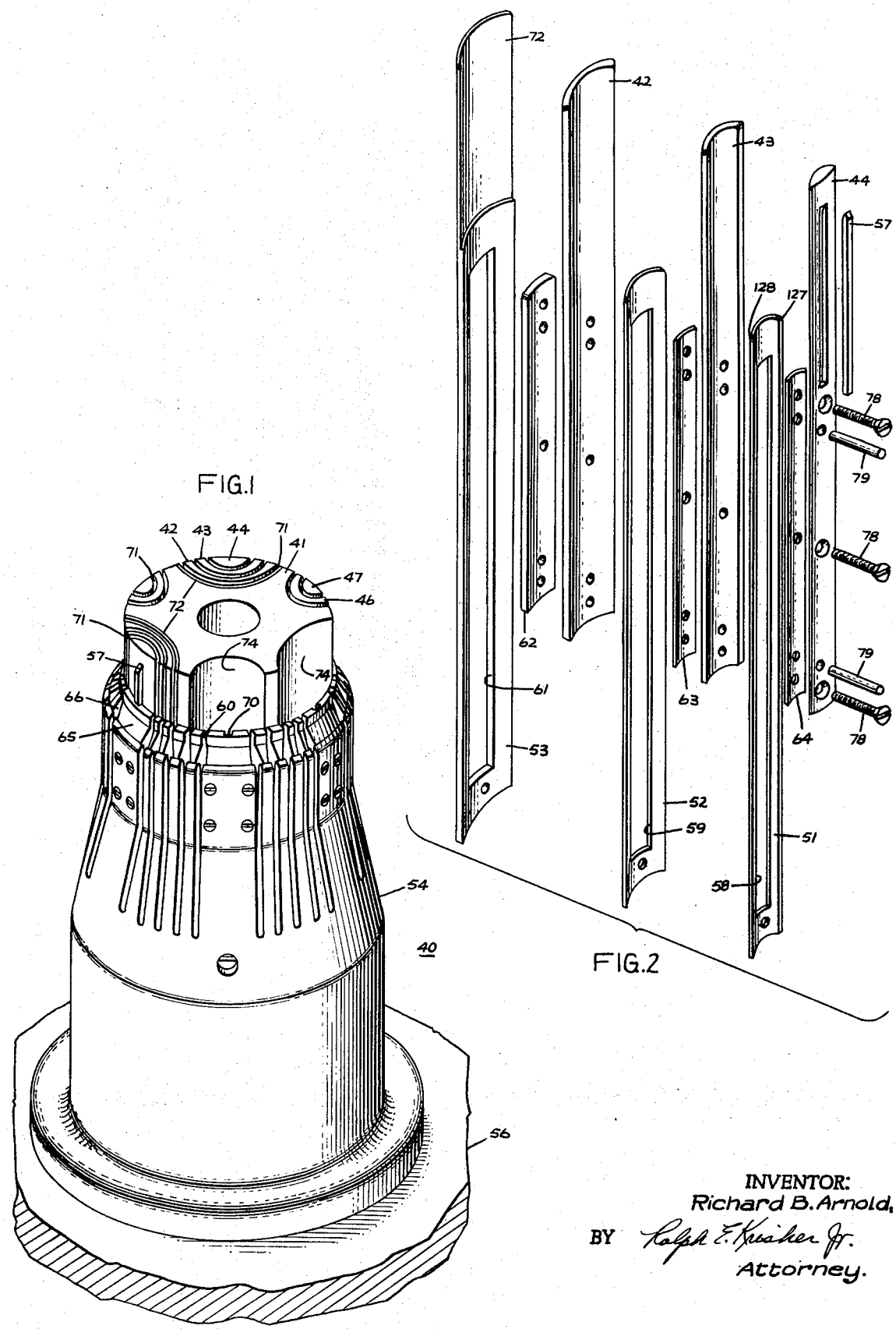
FIG. 1 is a perspective view with parts removed, of the upper portion or head assembly of an insulator and coil-inserting apparatus for use in placing winding coil groups on a stator core for use in a motor having a six-pole winding.
FIG. 2 is an exploded perspective view of feeder blades and parts of the divider blade section for use with the structure shown in FIG. 1.
Figure 3:
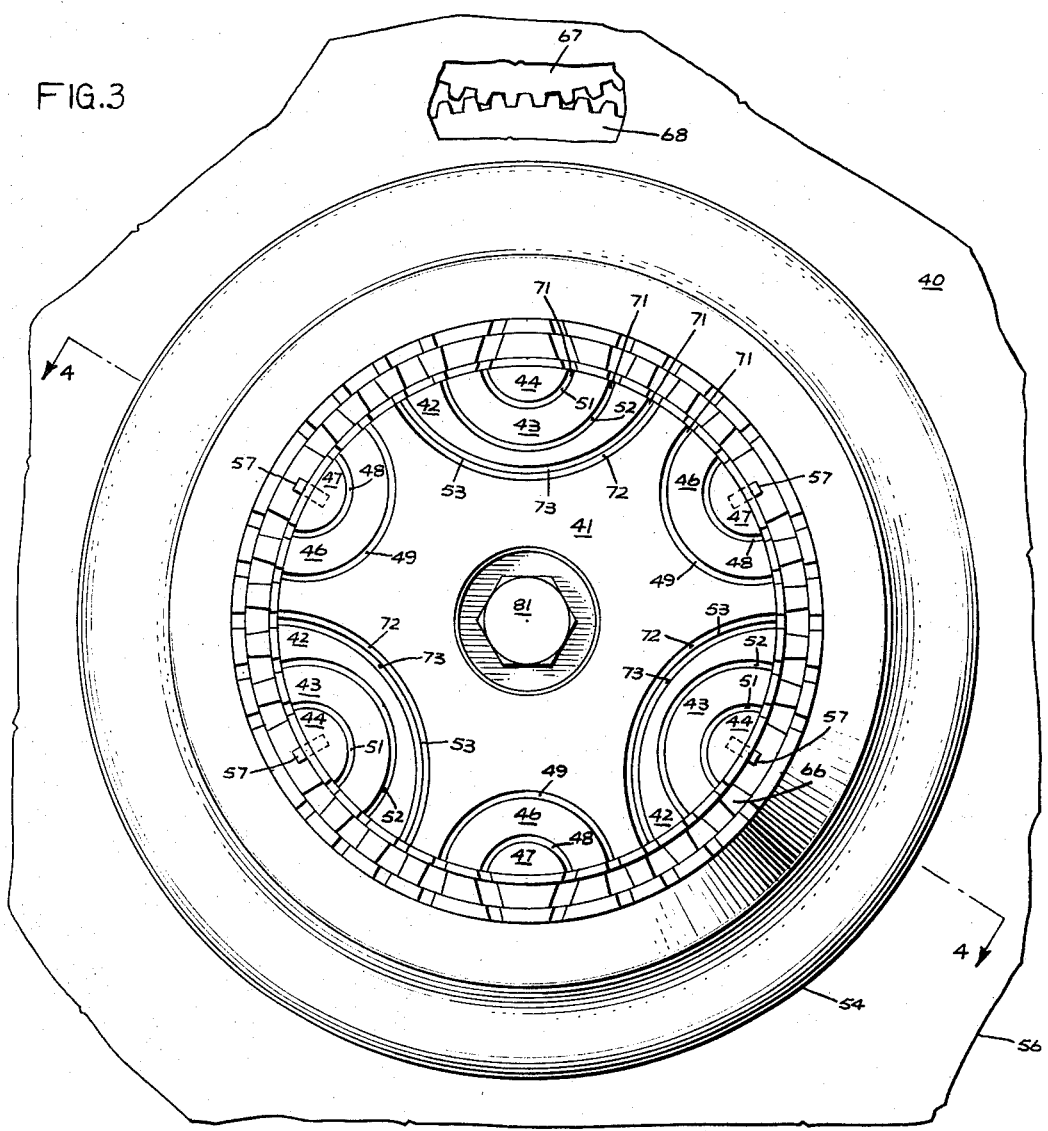
FIG. 3 is a top view of the insulator and coil-inserting apparatus shown in FIG. 1 with the removed parts assembled therewith.

Referring now to FIGS. 1 –3, the apparatus 40 includes a head assembly comprising a substantially solid central divider blade section 41 and other divider section defining elements 42, 43, 44, 46, 47 which are secured together with the central divider section 41. Disposed between the divider blade segments are a plurality of coil turn feeder blades 48, 49, 51, 52, 53 movable relative to the divider blade section. To avoid confusion, substantially identical feeder and divider blade segments have been identified with like reference numerals in the drawings.

The pusher blades and divider section, when assembled together are supported for movement within a wedge receiving housing 54 which is supported on suitable mounting structure which has been illustrated as including a turntable 56. Keys 57 prevent relative rotation between the feeder and divider blades and the housing 54 and may also interfit with a stator core to prevent rotation of the core on the apparatus 40 when supported on the head assembly.

It will be noted from an examination of FIG. 2 that the feeder blades 51, 52, 53 are formed with slots 58, 59, 61 which cooperate with stops 62, 63, 64 which form part of the divider blade section. These stops 62–64 limit movement of the feeder blades relative to the divider blade section and also impart rigidity to the structure and thus help to prevent binding of the feeder blades in the divider blade section.

As in the case of my application Ser. No. 875,895, the entire disclosure of which is specifically incorporated herein by reference, insulators may initially be loaded into the apparatus 40 by inserting them into insulator guide apertures 66 in a wedge guide 65 before a stator is positioned over the head assembly and before the coils are placed in the turn-receiving gaps of the head assembly. Preferably, the insulators are directly loaded from an insulator making an inserting apparatus of suitable construction. Further, it will be understood that after the insulators are loaded in the guide apertures 66, a predetermined number of coils are initially developed with a preselected number of turns per coil from insulated wire and disposed in the appropriate turn-receiving gaps of the head assembly. This coil developing operation may be accomplished in the manner desired, such as, for example, in the way disclosed in my copending patent application Ser. No. 748,406 which was filed on July 29, 1968 and is assigned to the assignee of the present application.

The improved insulation and turn inserting apparatus 40 is readily adapted for use in conjunction with apparatus of the type disclosed in my copending application Ser. No. 748,406 and the apparatus 40 is rotatably supported on the table 56 by ball bearings 93. As best shown in FIG. 3, a driving gear 67 meshes with a driven gear 68 attached to the guide housing 54. The driving gear 67 is driven to effect a desired number of degrees rotation of the apparatus 40 in order to align the turn-receiving gaps of the apparatus with a coil winder or coil transfer device as more specifically described in my application Ser. No. 875,895.

The insulator and turn inserting apparatus is generally comprised of an actuating assembly as well as the head assembly. The actuating assembly is shown and described in my application Ser. No. 875,895 and therefore is not otherwise illustrated in this application.

Still having reference to FIG. 3, the divider blade section and coil turn feeder blades define 15 turn-receiving gaps in which the turns of the coils to be inserted are placed. The bottom of these gaps are defined by the turn pushing surfaces of the feeder blades 51–53, 48 and 49. The peripheral edges of the gaps form slits 71, which are aligned with the axially extending slot entrances of a stator core when it is in position on the head assembly. It will be understood that the insulator guide apertures 66 are also axially aligned with the stator slots so that insulators can be pushed therein as the side turn portions of a coil are moved through the slot entrances.

As in the case of my application Ser. No. 875,895, the leading edges of insulators preferably trail behind the turn pushing surfaces of the coil turn feeder blades by a predetermined distance during coil insertion.

It will be noted that the three feeder blades 53 are each formed with a reduced portion 72 which define one side of the turn-receiving gaps 73 in order to eliminate friction between the coils disposed in the gaps 73 and the stationary divider blade section walls 74 during movement of coil turns along the gap 73.

Now referring to FIGS. 1, 2, 5 and 6, the guide members 62, 63, 64, 76, and 77 are held in assembled relation with the divider blades by screws 78 and removable pins 79. These guide members provide accurately maintained spaces in which the coil turn feeder blades are slidably disposed. The divider blade section 41 is attached by means of a stud 81 to a shaft 82 which is interconnected with an actuating assembly as above mentioned for effecting axial movement of the section 41 relative to the housing 54.

The shaft 82 is provided with a central bore 83 sealed by a set screw 84. Secured to the shaft 82 is a cylinder cap 86 threaded into a cylinder 87 to which a cap plate 88 secures a feeder blade retainer 89 by means of a plurality of bolts 91. In addition, as shown and described in my application Ser. No. 875,895, a pair of driver guide rods are secured to the locating plate 92. Then, when the gear 68 is driven, the wedge housing 54 rotates relative to the table 40 in the ball bearings 93, and the driver guide rods ensure that the actuating assembly will rotate with the locating plate 92. The feeder blades are secured to the feeder blade retainer by screws 94 and held in spaced relationship by spacers 96, 97, 98, 99, 101.

During operation of the apparatus 40, a source of air pressure is admitted to the bore 83 of the shaft 82 and through the radial passageway 102 in the shaft to the feeder blade cylinder 87. As described in my application Ser. No. 875,895, compression of air within the cylinder 87 cushions the feeder blades 48, 49, 51, 52, 53 as they move to a fully extracted or extended position relative to the divider blade section.

In addition, the relative positions of the insulator or wedge pushers 103, feeder blades, and divider blade section in the apparatus 40 are all relatively adjustable so that cores having various stack heights may be accommodated by the apparatus embodying the present invention.

The drawings, FIGS. 7 through 11, illustrate the operation of the apparatus 40 during insertion of one group of coils of the six-pole six coil group winding 33 into a stator core 31 having a stack height of approximately one and three quarters of an inch and a bore of about three and one half inches. In FIGS. 7 through 11, the side turn portions 106 of some of the coils of the four-pole winding 34 have also been shown, since the winding 34 is placed on the stator core 31 prior to placement of the winding 33.

Although the views of FIGS. 7–11 are taken in the direction of the arrows 5—5 in FIG. 3 and through the center of the tooth 107 of the stator core 31, parts of the stator core 31, including one tooth 107 have been broken from these FIGURES, for purposes of clarity, so that the slot 108, defined by the teeth 107 and 109 will be readily apparent. In addition, the key 57 has been omitted from the keyway 111.

Figure 11:
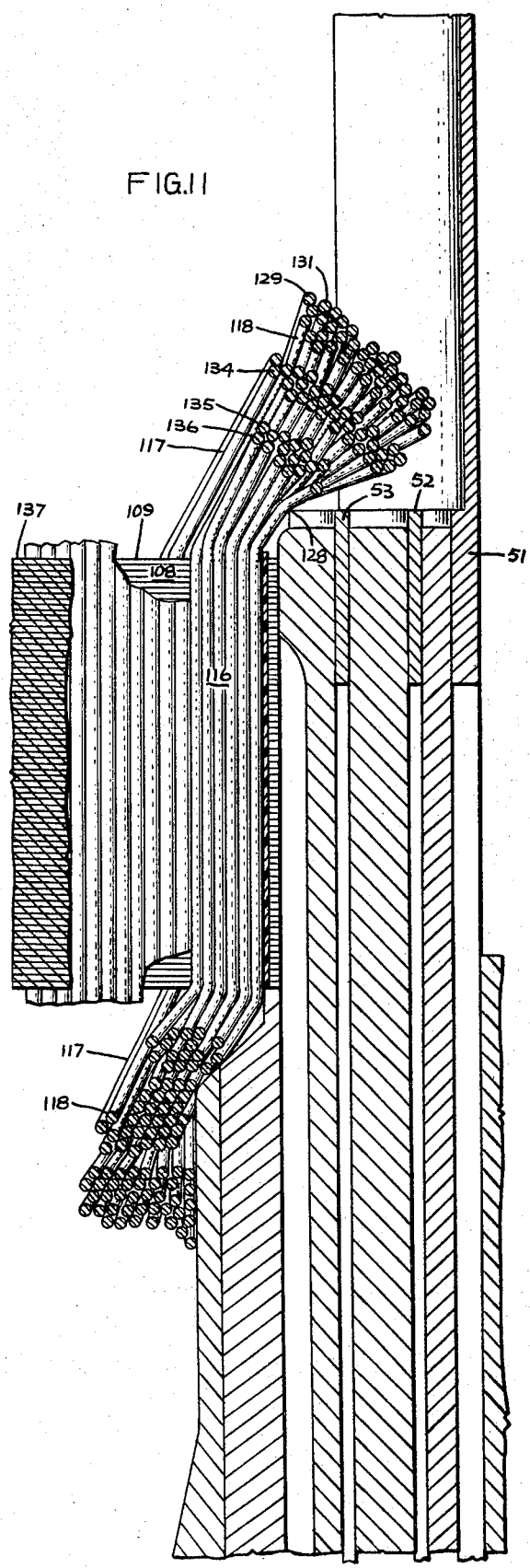
FIG. 11 is a view similar to FIG. 10 emphasizing the position of the coil turns at the end of the third increment of travel.

It will be understood that FIGS. 7 and 11 are representative of the extreme limits of travel of the feeder blades 51–53 relative to the divider blade section during operation of the apparatus 40 with a one and three quarter inch stack height stator core. With reference to FIG. 7, turn-receiving gaps 112 and 113 are defined, at the sides thereof, by the divider blades 44–43 and 43–42 respectively and the coil turn pushing surface of the feeder blades 53, 52 define the bottoms of these gaps. The sides of the gap 114 are defined by the surface of the divider blade 42 and the surface 72 of the feeder blade 53, whereas the bottom of the gap 114 is defined by the coil turn pushing surface of the feeder blade 53. Thus, the divider blades 42, 43 act as coil separators for the coils 116, 117, 118.

It should be noted that when the end turn portions of the coils are disposed in the gaps 112, 113, 114, they tend to be supported at the edges of the feeder blades and bow slightly upwardly because the curvature of the coils and the weight of the coils tend to bend the bulk of the coils downwardly about the external periphery of the housing 54. A slight space which may occur for this reason between the central portion of the feeder blade pushing surfaces and the bottom winding turn of the coils have been has been exaggerated in FIG. 7. One of these spaces, i.e., the space between the lowermost turn 119 in the coil 116 and the pushing or feeding surface of the feeder blade 53 has been denoted by the reference numeral 121.

It will be understood that in one cycle of operation of the apparatus 40, six coil groups are inserted into selected slots of the stator core 31 for movement by six sets of feeder blades, but that for clarity of description, an operational cycle of the apparatus will now be discussed with reference to only the coil group containing coils 116, 117, 118 and the structure shown in FIGS. 7–11.

At the beginning of a cycle, the coils 116, 117, 118 are placed in the turn-receiving gaps 112, 113, 114. In the specific exemplification, the coils were wound of 0.0427 inch diameter insulated wire with 16 turns in coil 116, 31 turns in coil 117, and 40 turns in coil 118.

The core 31 is then placed on the head assembly of the apparatus and clamped in place, with the keys 57 projecting into slot openings of the core to prevent rotation of the core relative to the head assembly.

With the divider blades, feeder blades, and insulator pushers relatively adjusted for insertion of coils into a one and three quarter inch stack height core, the surface of the end face 122 of the core 31 lies closely adjacent to the plane P in which the free extremities of the divider blades 44, 43, 42 lie after the core 31 has been clamped in place. I have found that a spacing of about one eighth of an inch between the end face 122 of the core 31 and the plane P is a suitable spacing therebetween.

This spacing is preferably selected so that a core is tightly retained on the divider blade section with the free extremity of the blade section extending through the bore of the core. For cores with stack heights of from one to two and one half inches, a spacing of one eighth inch has been found to be satisfactory for this purpose and is therefore preferred in order to permit efficient utilization of conductor material in the end turn portion of coils injected with apparatus embodying the invention.

When the apparatus 40 is used to insert windings into cores having stack heights greater than the stack height of the core 31, the apparatus 40 is adjusted to accommodate those cores as will be understood by reference to my application Ser. No.

875,895 with longer cores, the cores are clamped in place on the head assembly of the apparatus and the divider blade section is moved axially through the bore of the core so that the free extremity thereof is spaced closely adjacent to the upper end face of the core. It will therefore be appreciated that, for longer cores as well as the core 31, the free extremity of the divider blade section and the core axially relatively movable.

At the most extended position of the feeder blades relative to the divider blades (as shown in FIG. 11), the feeder blade turn pushing surfaces are also closely adjacent to the end face of the core. For the structure shown in FIG. 11, the pusher blade surfaces project only about one sixteenth of an inch above the plane P.

Now referring again to FIG. 7, it will be understood that the stator core 31 and divider blades are initially positioned relative to each other as shown. Then the feeder blades 51, 52, 53 are advanced in one continuous motion relative to the divider blades to the relative position illustrated in FIG. 11. FIGS. 8, 9 and 10 approximately represent movement of the coils 116, 117, 118 relative to the core 31 during operation of the apparatus. Although the actual amount of bending of the turns within a coil vary, and the precise mechanism by which the coil turns are bent during the insertion cycle is not known with certainty, visual inspection of stators after coil insertion with the apparatus 40 reveal small bends in the coils which correspond, for example, to bends 125, 126 in FIG. 8. Accordingly, the forces applied to the coils 116, 117, 118 during insertion and the resultant affect on the coils will also be described as best comprehended at this time.

Upon commencement of operation of the apparatus 40, the end turns of the coils 116, 117, 118 of the coil group move axially through the bore of the core toward the openings in the free extremity of the divider blade section. Then, as the side turns of the coils engage the closed end of the winding slots in the core (or the side turns 106 of windings previously placed in the slots), the coil turns 116, 117, 118 are apparently deformed and slightly bent as at 125, 126 while the side turns of the coils 116, 117, 118 move axially through the axially extending passageways of the core 31, i.e., the winding receiving slots.

In FIG. 8, the deformation of turns in the coil 116 denoted at 125 and 126 is believed to be a result of the interaction of the corners 127, 128 of the feeder blade 51 and the winding 106 with the coil 116.

FIG. 8 also illustrates the movement of the turns 129, 131 of the coil 118 from the opening of the gap 114. It will be noted that as the turns of the coil 118 emerge from the opening of the gap 114, they are freely shed from the apparatus 40, and are caused to move toward the generally solid section of the core 31. With continued movement of the feeder blades 51, 52, 53, the end turns 129, 131 and other turns emerging from the gap openings are also move outwardly from the center of the bore of the core 31.

This movement of the coil end turns is also shown in FIG. 9 and is believed to be caused at least in part by the frictional engagement of the side turn portions of other turns 132, 133 with the side turn portions of the turns 129, 131 within the turn-receiving slots of the core. Thus it is believed at this time that the turns 129, 131 are trapped by other turns and moved by the other turns of the coil 118. Furthermore, the blades 51, 52, 53 and coil turns move relatively rapidly and movement of the coil end turns away from the gap openings may also be caused, in part, by the inertia of the coil end turns as well as by some spring action of the wire turns which is believed to occur because of deformation of the turns during winding and insertion and tendency of the turns to return to an undeformed configuration.

FIG. 10 further illustrates the movement of the end turns of the coils 116, 117, 118 as the end turns 135, 136 of the innermost coil 116 in the coil group are shed from the apparatus 40. This view also clearly reveals the movement of the wedge 138 along the opening of the slot 108. At the end of feeder blade movement, the feeder blades 51, 52, 53 may project slightly beyond the extremity of the divider blade section, and the end turns of each of the coils will have moved toward the generally solid section of the core 31. However, as shown in FIG. 11, some turns of the coils may continue to be in engagement with the edges or corners of the feeder blades.

Thus, during insertion of the coils of winding 33, the end turns of the coils are moved axially through the bore of the stator 31 as the side turns thereof are advanced axially along the axially extending passageways or slots of the core. Then, for each coil within each coil group, the end turn portions of the turns in the coil are shed from the apparatus 40 and caused to move toward the yoke section 137 of the core. As previously discussed, as the end turns emerge from the gap openings the end turns move toward the yoke section of the core. In fact, when observing the apparatus 40 in operation, the end turns of the coils almost seem to pop from the gap openings and move to the position shown in FIG. 11. The feeder blades move from the first position shown in FIG. 7 to the second position shown in FIG. 11 rather rapidly, e.g., the feeder blades travel about four to seven inches in about one to two seconds. When observing the rapid movement of the coil end turns away from the gap openings, a rapid, continuous fan-like movement appears to take place. After all of the end turns of the coils have snapped or otherwise emerged from the gap openings formed in the free extremity of the divider blade section and have moved from a first position in the bore region or locale of the core to a second position closer to the yoke of the bore, the feeder blades and divider blade section are retracted as a unit through the bore of the core to the relative positions shown in FIG. 7. Then the core 31 with winding 33 in place is removed from the apparatus 40.

In the specific exemplification represented by FIGS. 7 through 11, the coil 116 is the innermost coil, the coil 118 is the outermost coil, and the coil 117 is an intermediate coil of one of one coil group. For maximum advantage, it is preferred that the end turns of all three coils 116, 117, 118 be freely shed as they emerge from the gaps in the free extremities of the divider blade section. However, benefits of the invention will still be realized if the end turns of the two innermost coils 116 and 117 are freely shed from the apparatus as they emerge from the gaps 112, 113. In the case of the coil groups moved by the feeder blades 48, 49, wherein there are only two coils in a coil group, the two innermost coils would both be innermost coils, although one of them could also be defined as an outermost coil for that coil group.

Figure 12:
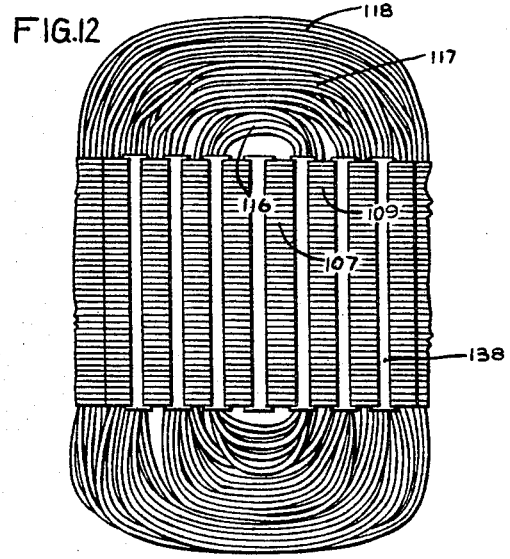
FIG. 12 is an elevational view, with parts broken away, of a section of a core with winding coils positioned in accordance with the invention and showing the relative configuration and position of the winding coils on the core.
Figure 13:
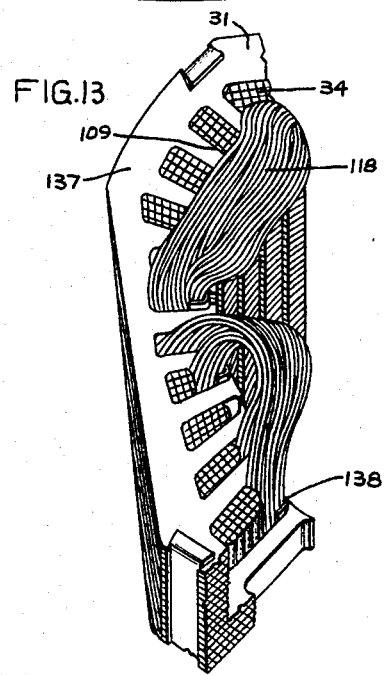
FIG. 13 is a perspective view of the core and coils shown in FIG. 12.
Figure 14:
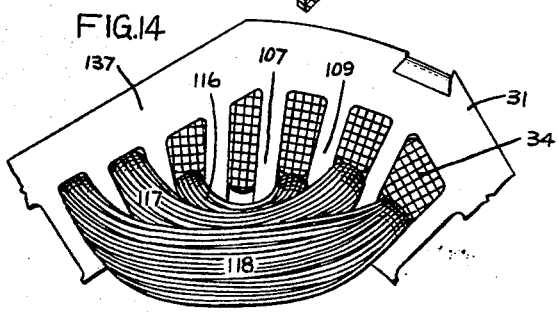
FIG 14 is a plan view of a portion of the structure shown in FIG. 13.

Turning now to FIGS. 12 through 14, the final relationships of the insulators or wedges 138 and coil groups in the stator core 31 are illustrated. In this view, windings forming part of the second main winding 34 have been broken away for purposes of clarity.

FIG. 14 has been reproduced as FIG. 16 and a portion of FIG. 12 has been reproduced as FIG. 18. A portion of FIG. 11 has been reproduced as FIG. 20. For purposes of comparison, FIG. 19 shows an apparatus 139 wherein the outermost and next to innermost coils 141, 142 in a coil group have been trapped and retained by a coil feeder blade 143. The apparatus 139 does not embody the present invention and coils 141, 142, 144 injected by the apparatus 139 in a core 146 would appear as shown in FIGS. 15 and 17.

Comparing first FIGS. 19 and 20, it will be appreciated that with the apparatus 139, a sufficient length of winding material must be provided for each end turn of the coils 141, 142 to extend from the core end face 147 upwardly and radially inwardly to the confined bore region or locale 148 and back to the end face 147 of the core 146. Not only must a sufficient length of conductor be provided to permit retention of the coil end turns within the confined bore region 148 but, furthermore, sufficient turn length must also be provided to permit a stacking of the coil end turns between the feeder blades 143, 149. The amount of conductor material required for this purpose will be best appreciated by comparing FIGS. 15, 17, with FIGS. 16, 18.

The increased use of conductor material (which may be any suitable material, e.g., copper or aluminum) for the formation of winding end turns when they are to be injected with the apparatus 139 is further aggravated by the fact that with automatic winding equipment, all of the coil turns in a given coil are formed of the same length of conductor. This means that the extra conductor length provided for the end turn 151 must also be provided for all other end turns within the same coil. Thus, as will be quickly appreciated from a comparison of FIGS. 15 and 16, and FIGS. 17 and 18, the mean arcuate height and mean arcuate length of the end turns of the coils 141, 142 could be reduced by following the teachings of the present invention.

Although in the illustrated embodiments of my invention, I have shown the coil receiving gaps of the apparatus 40 as being substantially constant, it will be appreciated that in some applications it may be desirable to vary the dimensions of the gaps. From the foregoing description of the improved insulator and turn inserting apparatus and method exemplifying my invention, it will be apparent that the placement of insulators and coil turns into a slotted structure can be efficiently accomplished while significantly reducing the amount of winding material that must be provided for the end turn portions of the winding. This provides the advantages in a finished motor of reducing the cost thereof as a result of reduced material usage; improving the efficiency for a given motor design by reducing the winding resistance thereof; reducing the amount of heat associated with a given power input and given motor design because of lower winding resistance; and reducing the physical bulk in the end turn region.

Furthermore, with the improved head assembly arrangement herein shown, a rigid structure is provided for precisely controlling the insertion of coil side turn portions of a winding.

While I have shown and described various embodiments of the invention, it will be obvious to those skilled in the art that changes and modifications may be made therein without departing from the invention. It is therefore intended in the appended claims to cover all such changes and modifications that fall within the true spirit and scope of my invention.

What I claim as new and desire to secure by Letters Patent of the United States is:

1. A method of inserting side turn portions of a group of at least two electrical coils formed of conductor wire into predetermined axially extending slots of a core having a generally solid section and axially extending slot entrances in communication with a periphery of the core and extending between two faces of the core, the method comprising the steps of moving side turn portions of the electrical coils into and axially along the axially extending slots while confining end turn portions of the electrical coils in a locale away from the slot entrances and generally solid section; releasing at least some of the end turn portions of at least the two innermost coils of a coil group for movement toward the generally solid section of the core; and causing said at least some the end turn portions to be displaced generally toward the generally solid section while advancing side turn portions of the electrical coils connected to other end turn portions axially along the axially extending slots.

2. The method of claim 1 including moving other end turn portions of the at least two coil groups to the end of a path of confinement in the locale away from the slot entrances and generally solid section of the core; and causing the other end turn portions of the at least two coil groups to be displaced generally toward the generally solid section of the core.

3. A method of inserting side turn portions of a group of electrical coils formed of conductor wire into predetermined axially extending slots of a core having a yoke section and axially extending slot entrances in communication with a periphery of the core and extending between two end faces of the core while moving at least some of the end turns of at least two coils of a given coil group from a region of confinement toward the yoke section; the steps of: confining the end turn portions of the coils in turn-receiving gaps extending to the free extremity of an inserting apparatus and having movable blades disposed therein; axially inserting some of the side turn portions of at least two coils in a given coil group into the predetermined slots by moving the movable blades within the gaps; transporting at least some of the end turn portions of at least two coils along the gaps to the free extremity of the apparatus; releasing at least some of the end turn portions of the at least two coils from confinement in the gaps for movement toward the yoke section; thereby moving at least some of the end turn portions toward the yoke section while continuing to move the movable blades within the gaps.

4. The method of claim 3 including transporting other of the end turn portions of the at least two coils along the gaps to the free extremity of the apparatus and causing the other of the end turn portions of the at least two coils to move away from the turn-receiving gaps and toward the yoke section.

5. Apparatus for inserting coil side turn portions of a group of electrical coils formed of conductor wire into predetermined axially extending slots of a core having a yoke section, a central axially extending bore, and axially extending slot entrances in communication with the bore and the slots, while moving the end turn portions of at least two coils of a given coil group toward the yoke section, said apparatus comprising: a divider blade section and coil turn feeder blades having free extremities for extension along the bore of the core; adjacent ones of a plurality of the divider blades defining gaps in alignment with predetermined ones of the slot entrances of the core; said feeder blades being mounted within the gaps for movement between first and second positions with the free extremities of a plurality of the feeder blades being spaced from the divider blade free extremities and forming the bottom of the gaps in the first position; said free extremities lying closely adjacent to the divider blade free extremities in the second position; and means for moving the feeder blades between the first and second positions whereby winding end turns are moved to the divider blade free extremities by feeder blades and freely shed toward the yoke section of the core.

6. The apparatus of claim 5 wherein the coil turn feeder blades and divider blade section are relatively positioned for moving at least four coil groups and the free extremities of at least two adjacent feeder blades, adapted to move the two innermost coils of a coil group, lie closely adjacent to the free extremity of the free extremity of the divider blade section in said second position.

7. Apparatus for inserting coil side turn portions of a group of electrical coils formed of conductor wire into predetermined axially extending slots of a core of preselected axial length and having a central axially extending bore and axially extending slot entrances in communication with the bore, the apparatus comprising: a plurality of spaced apart divider blades arranged to define means for receiving the coil turns of a group of coils and having free extremities for passage through the bore of a core; a plurality of coil turn feeder blades positioned between said divider blades; said feeder blades being formed with turn-pushing surfaces; the turn-pushing surfaces of the feeder blades in a first position forming the bottom of turn-receiving gaps formed between adjacent divider blades; said divider blades and said feeder blades being received in the bore of the core with said gaps in alignment with predetermined ones of the axially extending slot entrances; the turn-pushing surface of a first feeder blade being adapted for pushing an innermost coil of a coil group and the turn-pushing surface of a second feeder blade being adapted for pushing a next to innermost coil of the coil group; said divider blades and said feeder blades being mounted for relative movement in an axial direction to insert the side turn portions of the group of coils into the slots of the core with at least the first and second feeder blades being limited in movement relative to the divider blades, whereby the free extremity of the first and second feeder blades are movable between the first position and a second position adjacent to the free extremity of the divider blade section; and means for moving the feeder blades between the first and second positions for moving the end turns of coils along the gaps and shedding the end turns from the gaps.

8. The apparatus of claim 7 wherein the divider blade section and turn feeder blades form a substantially solid and rigid assembly, and the feeder blades are arranged for effecting the movement of coils of at least four coil groups.

9. The apparatus of claim 8 wherein at least one of the feeder blades includes an extension that forms one side of a turn-receiving gap in the apparatus; said extension projecting substantially beyond the free extremity of the divider blade section when the feeder blades are in the second position.

* * * * *